(12) United States Patent
Ogawa et al.

(10) Patent No.: US 10,108,034 B2
(45) Date of Patent: Oct. 23, 2018

(54) METHOD OF MANUFACTURING IMAGE DISPLAY DEVICE

(71) Applicant: DEXERIALS CORPORATION, Tokyo (JP)

(72) Inventors: Kouichi Ogawa, Utsunomiya (JP);
Yoshihisa Shinya, Utsunomiya (JP);
Naoki Hayashi, Kanuma (JP);
Tomoyuki Toyoda, Kanuma (JP)

(73) Assignee: DEXERIALS CORPORATION, Tokyo (JP)

( * ) Notice: Subject to any disclaimer, the term of this patent is extended or adjusted under 35 U.S.C. 154(b) by 245 days.

(21) Appl. No.: 15/247,219

(22) Filed: Aug. 25, 2016

(65) Prior Publication Data

US 2016/0363793 A1 Dec. 15, 2016

Related U.S. Application Data

(62) Division of application No. 14/004,281, filed as application No. PCT/JP2013/051425 on Jan. 24, 2013, now Pat. No. 9,459,475.

(30) Foreign Application Priority Data

Dec. 14, 2012 (JP) ................................ 2012-272896

(51) Int. Cl.
*G02F 1/1333* (2006.01)
*H05B 33/10* (2006.01)
(Continued)

(52) U.S. Cl.
CPC ...... *G02F 1/1333* (2013.01); *C08F 222/1006* (2013.01); *C09J 4/00* (2013.01);
(Continued)

(58) Field of Classification Search
CPC .... G02F 1/13; G02F 1/1333; C08F 222/1006; H01L 33/58; H01L 33/56; B29C 65/14
See application file for complete search history.

(56) References Cited

U.S. PATENT DOCUMENTS

| 6,004,413 A | 12/1999 | Couttenier |
| 2009/0162645 A1 | 6/2009 | Matsuhira |

(Continued)

FOREIGN PATENT DOCUMENTS

| CN | 101218533 A | 7/2008 |
| EP | 2144218 A1 | 1/2010 |

(Continued)

OTHER PUBLICATIONS

Mar. 3, 2015 Office Action issued in Chinese Patent Application No. 201380000467.X.

(Continued)

*Primary Examiner* — Daniel McNally
(74) *Attorney, Agent, or Firm* — Oliff PLC

(57) ABSTRACT

An image display device is manufactured by: applying a liquid photo-curable resin composition having a total value of cure shrinkage ratios based on pre-curing and complete curing of 3% or more to a surface of the light-transmitting cover member or a surface of the image display member with a thickness greater than that of the light-shielding layer to cancel the step between the light-shielding layer and the light-shielding layer forming surface of the light-transmitting cover member; pre-curing the photo-curable resin composition with the irradiation of ultraviolet rays to form a pre-cured resin layer; bonding the light-transmitting cover member to the image display member such that the pre-cured resin layer is placed inside; and subjecting the pre-cured resin layer to the irradiation of ultraviolet rays to achieve the complete curing thereof. The pre-curing is (Continued)

conducted to obtain a cure shrinkage ratio less than 3% in the complete curing thereof.

8 Claims, 4 Drawing Sheets

(51) Int. Cl.
| | |
|---|---|
| *G06F 3/041* | (2006.01) |
| *H01J 9/20* | (2006.01) |
| *C08F 222/10* | (2006.01) |
| *C09J 4/06* | (2006.01) |
| *C09J 4/00* | (2006.01) |
| *G02F 1/1335* | (2006.01) |
| *H01L 51/50* | (2006.01) |

(52) U.S. Cl.
CPC .......... *C09J 4/06* (2013.01); *G02F 1/133308* (2013.01); *G02F 1/133512* (2013.01); *G06F 3/041* (2013.01); *H01J 9/20* (2013.01); *H05B 33/10* (2013.01); *G02F 2001/133331* (2013.01); *G02F 2202/023* (2013.01); *G02F 2202/28* (2013.01); *H01L 51/50* (2013.01)

(56) References Cited

U.S. PATENT DOCUMENTS

| | | | |
|---|---|---|---|
| 2010/0003425 A1 | 1/2010 | Kamata et al. | |
| 2010/0043965 A1 | 2/2010 | Kamiya et al. | |
| 2010/0097746 A1* | 4/2010 | Toyoda ............. | G02F 1/133308 361/679.01 |
| 2010/0164881 A1 | 7/2010 | Kuo et al. | |
| 2010/0259829 A1 | 10/2010 | Kim et al. | |
| 2010/0277684 A1 | 11/2010 | Fukushima et al. | |
| 2011/0134378 A1 | 6/2011 | Tsuboi et al. | |
| 2013/0029075 A1 | 1/2013 | Niiyama et al. | |

FOREIGN PATENT DOCUMENTS

| | | |
|---|---|---|
| JP | 2008-282000 A | 11/2008 |
| JP | 2009-086656 A | 4/2009 |
| JP | 2009-186954 A | 8/2009 |
| JP | 2011-138099 A | 7/2011 |
| JP | 2012-071281 A | 4/2012 |
| WO | 2007/066590 A1 | 6/2007 |
| WO | 2008/007800 A1 | 1/2008 |
| WO | 2008/126860 A1 | 10/2008 |
| WO | 2009/011353 A1 | 1/2009 |
| WO | 2009/054168 A1 | 4/2009 |
| WO | 2010/027041 A1 | 3/2010 |
| WO | 2011/148990 A1 | 12/2011 |
| WO | 2012/099171 A1 | 7/2012 |

OTHER PUBLICATIONS

Apr. 14, 2016 Extended Search Report issued in European Patent Application No. 13776401.5.
Written Opinion of the International Searching Authority issued in International Application No. PCT/JP2013/051425 dated Nov. 21, 2013.
International Search Report issued in International Patent Application No. PCT/JP2013/051425 dated Apr. 9, 2013 (w/translation).

* cited by examiner

[FIG. 1A]
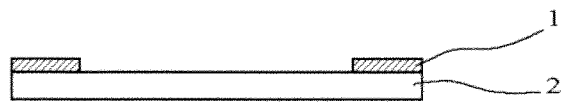
[FIG. 1B]
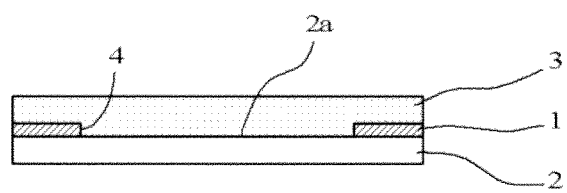
[FIG. 1C]
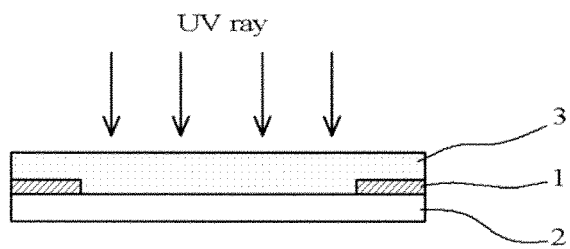
[FIG. 1D]
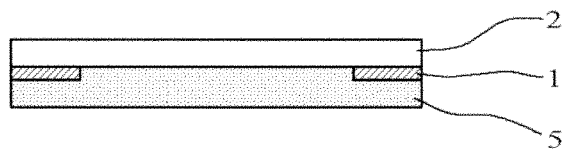
[FIG. 1E]
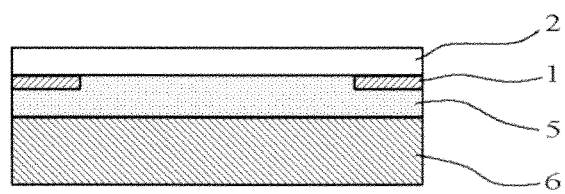
[FIG. 1F]
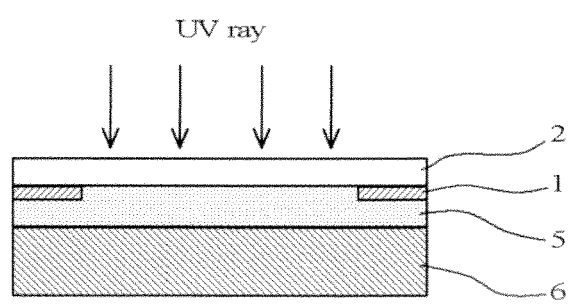

[FIG. 1G]
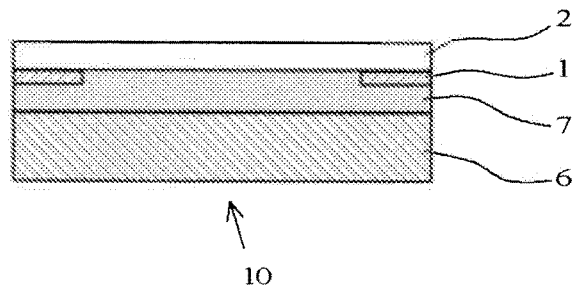
[FIG. 2A]
[FIG. 2B]
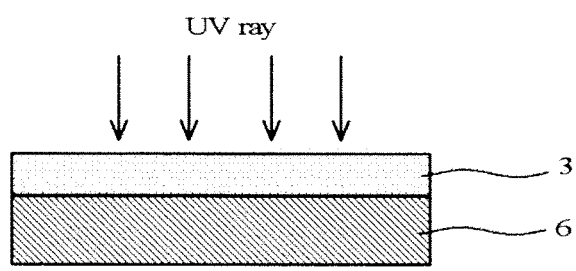
[FIG. 2C]
[FIG. 2D]
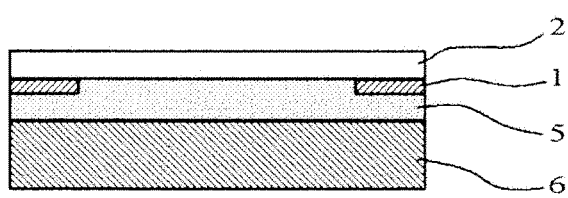

[FIG. 2E]
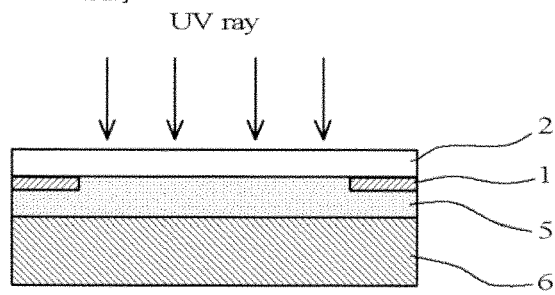
[FIG. 2F]
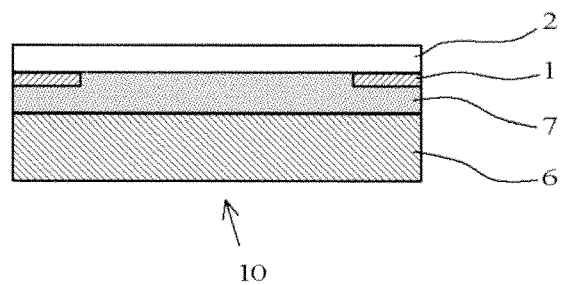
[FIG. 3]
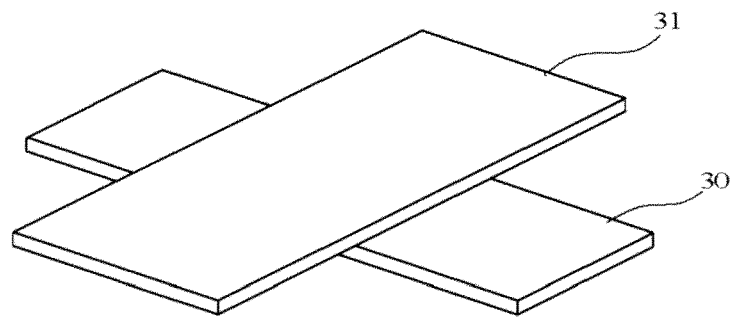
[FIG. 4A]
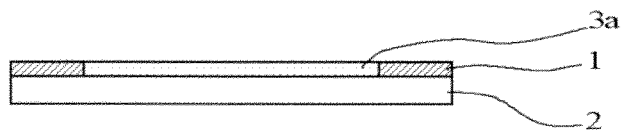
[FIG. 4B]
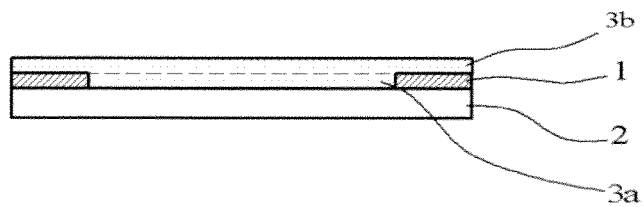

[FIG. 5]
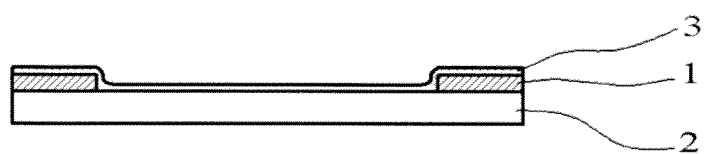
[FIG. 6]
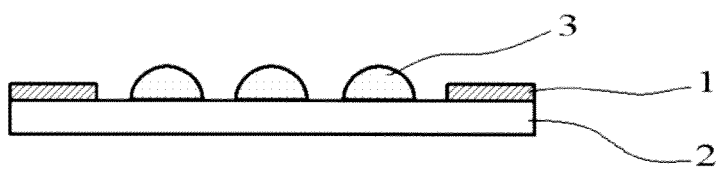
[FIG. 7]
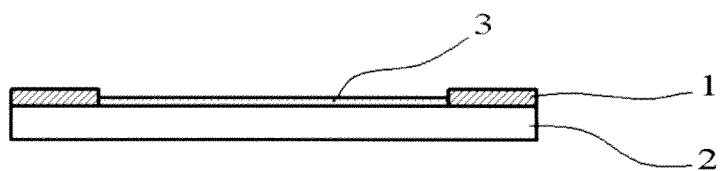

METHOD OF MANUFACTURING IMAGE DISPLAY DEVICE

This is a Division of application Ser. No. 14/004,281 filed Sep. 10, 2013, which in turn is a National Stage application of PCT/JP2013/051425 filed on Jan. 24, 2013, which claims the benefit of Japanese Patent Application No. 2012-272896 filed Dec. 14, 2012. The disclosure of the prior applications is hereby incorporated by reference herein in its entirety.

TECHNICAL FIELD

The present invention relates to a method of manufacturing an image display device by bonding and stacking an image display member such as a liquid crystal display panel and a light-transmitting cover member such as a transparent protective sheet, which is arranged on the side of a surface of the image display member, via a light-transmitting cured resin layer.

BACKGROUND ART

An image display device such as a liquid crystal display panel used in information terminals such as smartphones is manufactured by: providing a photo-curable resin composition between an image display member such as a liquid crystal display panel or an organic EL panel and a light-transmitting cover member; and curing the composition with the irradiation of ultraviolet rays so as to obtain a light-transmitting cured resin layer, thereby bonding and stacking the image display member and the light-transmitting cover member (Patent Literatures 1 and 2).

By the way, a light-shielding layer is provided on a peripheral part of a surface of the light-transmitting cover member on the side of the image display part in order to increase the luminance or contrast of displayed images. Thus, curing of the photo-curable resin composition held between such a light-shielding layer and the image display member does not proceed sufficiently. As a result, sufficient adhesive force cannot be obtained, thereby leading to concerns about delamination between the light-transmitting cover member and the image display member, reduction in image quality due to the entry of moisture into the resultant gap, and the like.

In view of the above, there has been proposed to blend a thermal polymerization initiator into a photo-curable resin composition so as to obtain a thermosetting and photo-curable resin composition; apply the thermosetting and photo-curable resin composition to the surface of the light-transmitting cover member with a light-shielding layer formed thereon; layer the applied surface over an image display member; subject the applied surface to the irradiation of ultraviolet rays to achieve the photo-curing thereof; and then heat the entire structure so as to thermally cure the thermosetting and photo-curable resin composition interposed between the light-shielding layer and the image display member (Patent Literature 3).

CITATION LIST

Patent Literature

Patent Literature 1: International Publication No. WO2010/027041
Patent Literature 2: Japanese Patent Application Laid-open Publication No. 2008-282000
Patent Literature 3: International Publication No. WO2008/126860

SUMMARY OF INVENTION

Technical Problem

However, although the problems concerned in Patent Literatures 1 and 2 are expected to be resolved according to the technique of Patent Literature 3, it requires simultaneous use of a photopolymerization initiator and a thermal polymerization initiator and the conduct of thermal polymerization process in addition to photopolymerization process. Thus, there existed a problem of an increased burden of a capital investment for the thermal polymerization process and a problem of deteriorating preservation stability of the thermosetting and photo-curable resin composition. Furthermore, when the light-transmitting cover member on which the thermosetting and photo-curable resin composition has been applied is layered on the image display member, the resin composition has not yet gone through a curing process at this point. Thus, the resin composition may be removed from a region between the light-shielding layer and the surface of the light-transmitting cover member, thereby failing to cancel a step between the light-shielding layer and the surface of the light-transmitting cover member. Also, there exist concerns about the occurrence of problems such as the generation of air bubbles and interlayer delamination between the light-transmitting cover and the resin. Moreover, the photo-curable resin composition is cured and shrunk by the irradiation of ultraviolet rays. Thus, in a case where a photo-curable resin composition with a cure shrinkage ratio of 3% or even with a cure shrinkage greater than 5% is used for an application in an image display device, there existed a problem that images displayed on the image display member are distorted.

It is an object of the present invention to solve the above-described problems in the conventional techniques. When manufacturing an image display device by stacking an image display member and a light-transmitting cover member arranged on the side of a surface of the image display member via a cured resin layer of a photo-curable resin composition, an object of the present invention is to allow, without utilizing a thermal polymerization process, the photo-curable resin composition between a light-shielding layer and the image display member to be sufficiently photo-cured without being removed therefrom and also to allow a step between the light-shielding layer and the surface of the light-transmitting cover member to be cancelled. Another object thereof is to allow an image display device to be manufactured only with the photopolymerization process. A further object thereof is to allow the distortion of images displayed on the image display member to be eliminated.

Solution to Problem

The present inventor has found that by first applying a liquid photo-curable resin composition containing no thermal polymerization initiator to a surface of a light-transmitting cover member including a light-shielding layer or a surface of an image display member so as to have a thickness greater than that of the light-shielding layer and then pre-curing the photo-curable resin composition as it is with the irradiation of ultraviolet rays, it becomes possible to completely cure the pre-cured resin layer with the irradiation of ultraviolet rays after the image display member and the light-transmitting cover member are stacked via such a pre-cured resin layer, a light-transmitting cured resin layer between the light-shielding layer and the image display member can be photo-cured sufficiently without being removed therefrom, and a step between the light-shielding layer and a light-shielding layer forming surface of the light-transmitting cover member can be cancelled. Furthermore, the present inventor has found that if a photo-curable resin composition with a cure shrinkage ratio greater than 3% is pre-cured to preliminarily cause shrinkage due to curing before the light-transmitting cover member and the image display member are bonded together and then the photo-curable resin composition is completely cured with the final irradiation of ultraviolet rays after the light-transmitting cover member and the image display member are bonded together, a cure shrinkage ratio during the complete curing can be reduced to be less than 3% and a distortion of an image displayed on the image display member can be significantly suppressed by significantly reducing a stress imposed on a bonded structure after bonded. Based on these findings, the present inventor has completed the present invention.

Thus, the present invention provides a method of manufacturing an image display device where an image display member and a light-transmitting cover member with a light-shielding layer formed on a peripheral portion thereof are stacked via a light-transmitting cured resin layer formed from a liquid photo-curable resin composition such that a light-shielding layer forming surface of the light-transmitting cover member is disposed on a side of the image display member. The method includes the following steps of (A) to (D):

<Step (A)>
a step of applying the liquid photo-curable resin composition to the light-shielding layer forming surface of the light-transmitting cover member or a surface of the image display member to a thickness greater than that of the light-shielding layer so as to cancel a step formed between the light-shielding layer and the light-shielding layer forming surface of the light-transmitting cover member;

<Step (B)>
a step of pre-curing the applied photo-curable resin composition with irradiation of ultraviolet rays so as to form a pre-cured resin layer;

<Step (C)>
a step of bonding the light-transmitting cover member to the image display member such that the light-shielding layer and the pre-cured resin layer are placed inside; and <Step (D)>
a step of subjecting the pre-cured resin layer held between the image display member and the light-transmitting cover member to the irradiation of ultraviolet rays to completely cure the resin layer to thereby stack the image display member and the light-transmitting cover member via the light-transmitting cured resin layer to obtain the image display device, wherein the pre-curing in the step (B) is conducted so as to obtain a cure shrinkage ratio less than 3% in the step (D) when a total value of cure shrinkage ratios of the liquid photo-curable resin composition based on the pre-curing in the step (B) and the complete curing in the step (D) is greater than or equal to 3%.

Advantageous Effects of Invention

According to the method of manufacturing an image display device of the present invention, after the liquid photo-curable resin composition containing no thermal polymerization initiator is applied to a surface of the light-transmitting cover member including a light-shielding layer or a surface of an image display member so as to have a thickness greater than that of the light-shielding layer, the photo-curable resin composition is pre-cured as it is with the irradiation of ultraviolet rays so as to form a pre-cured resin layer. Subsequently, after the image display member and the light-transmitting cover member are stacked via the pre-cured resin layer, the pre-cured resin layer is subjected to the irradiation of ultraviolet rays to completely cure the resin layer, thereby forming the light-transmitting cured resin layer. Thus, the light-transmitting cured resin layer between the light-shielding layer and the image display member can be photo-cured sufficiently without being removed therefrom, and a step between the light-shielding layer and the light-shielding layer forming surface of the light-transmitting cover member can be cancelled.

Moreover, since the pre-curing in the step (B) is conducted so as to obtain a cure shrinkage ratio less than 3% in the step (D), it becomes possible to reduce a distortion ultimately given to the image display member. Thus, a photo-curable resin composition having its own cure shrinkage ratio of 3% or more can be used as a photo-curable resin composition applicable to the present invention.

BRIEF DESCRIPTION OF DRAWINGS

FIG. 1A is an explanatory view of a step (A) of a method of manufacturing an image display device according to the present invention.

FIG. 1B is an explanatory view of the step (A) of the method of manufacturing an image display device according to the present invention.

FIG. 1C is an explanatory view of a step (B) of the method of manufacturing an image display device according to the present invention.

FIG. 1D is an explanatory view of the step (B) of the method of manufacturing an image display device according to the present invention.

FIG. 1E is an explanatory view of a step (C) of the method of manufacturing an image display device according to the present invention.

FIG. 1F is an explanatory view of a step (D) of the method of manufacturing an image display device according to the present invention.

FIG. 1G is an explanatory view of the step (D) of the method of manufacturing an image display device according to the present invention.

FIG. 2A is an explanatory view of a step (AA) of a method of manufacturing an image display device according to the present invention.

FIG. 2B is an explanatory view of a step (BB) of the method of manufacturing an image display device according to the present invention.

FIG. 2C is an explanatory view of the step (BB) of the method of manufacturing an image display device according to the present invention.

FIG. 2D is an explanatory view of a step (CC) of the method of manufacturing an image display device according to the present invention.

FIG. 2E is an explanatory view of a step (DD) of the method of manufacturing an image display device according to the present invention.

FIG. 2F is an explanatory view of the step (DD) of the method of manufacturing an image display device according to the present invention.

FIG. 3 is an explanatory view of an adhesive strength test of a light-transmitting cured resin layer.

FIG. 4A is an explanatory view of an aspect of applying a photo-curable resin composition to a light-transmitting cover member in Example 4.

FIG. 4B is an explanatory view of the aspect of applying a photo-curable resin composition to the light-transmitting cover member in Example 4.

FIG. 5 is an explanatory view of an aspect of applying a photo-curable resin composition to a light-transmitting cover member in Comparative Example 1.

FIG. 6 is an explanatory view of an aspect of applying a photo-curable resin composition to a light-transmitting cover member in Comparative Example 2.

FIG. 7 is an explanatory view of an aspect of applying a photo-curable resin composition to a light-transmitting cover member in Comparative Example 3.

DESCRIPTION OF EMBODIMENTS

A method of manufacturing an image display device of the present invention having steps (A) to (D) will now be described below in detail for each of the steps with reference to the drawings.

<Step (A) (Application Step)>

First, as shown in FIG. 1A, a light-transmitting cover member 2 is prepared having a light-shielding layer 1 formed on a peripheral portion of one surface thereof. As shown in FIG. 1B, a liquid photo-curable resin composition 3 is applied to a surface 2a of the light-transmitting cover member 2 to have a greater thickness than that of the light-shielding layer 1 so as to cancel a step 4 formed between the light-shielding layer 1 and the light-shielding layer forming surface 2a of the light-transmitting cover member 2. More specifically, in order to prevent a step from being generated, the photo-curable resin composition 3 is applied over the entire light-shielding layer forming surface 2a of the light-transmitting cover member 2 including a surface of the light-shielding layer 1 to form a flat surface. Thus, the photo-curable resin composition 3 is applied to have a thickness preferably 2.5 to 40 times, more preferably 2.5 to 12.5 times, and further preferably 2.5 to 4 times that of the light-shielding layer 1.

Note that the application of the photo-curable resin composition 3 can be performed more than once in order to obtain a desired thickness.

Note that the light-transmitting cover member 2 is required only to have light-transmitting properties allowing an image formed on an image display member to be visually recognized. Examples thereof may include a plate-shaped material and a sheet-shaped material such as glass, acrylic resin, polyethylene terephthalate, polyethylene naphthalate, and polycarbonate. These materials can be subjected to a single-sided or double-sided hard coat treatment, an antireflection treatment, or the like. The physical properties of the light-transmitting cover member 2 such as a thickness and elasticity thereof can be appropriately determined in accordance with the intended use.

The light-shielding layer 1 is provided in order to enhance the contrast of an image or the like. The light-shielding layer 1 is obtained by applying a coating material colored black or the like by means of a screen printing method or the like followed by drying and curing the coating material. The light-shielding layer 1 typically has a thickness in a range between 5 and 100 μm, and this thickness corresponds to the step 4.

The state of the photo-curable resin composition 3 used in this step is liquid. Since the photo-curable resin composition 3 in a liquid state is used, it is possible to cancel the step 4 formed between the light-shielding layer 1 and the light-shielding layer forming surface 2a of the light-transmitting cover member 2. The liquid state used herein refers to a state having a viscosity in a range between 0.01 and 100 Pa·s (25° C.) as measured by a cone-plate rheometer.

Preferred examples of such a photo-curable resin composition 3 may include those containing, as a main component, an acrylate-based oligomer component (component (I)), an acrylate-based monomer component (component (II)), and a photopolymerization initiator (component (III)). Moreover, the final cure shrinkage ratio of the photo-curable resin composition 3 is 3% or greater. It may be 5% or greater.

The "final cure shrinkage ratio" used herein refers to a cure shrinkage ratio generated between an uncured state of the photo-curable resin composition and a completely-cured state thereof. The completely-cured state used herein refers to a cured state in which a cure rate reaches at least 90% as will be described later. Hereinafter, the final cure shrinkage ratio is referred to as an overall cure shrinkage ratio. Moreover, a cure shrinkage ratio generated between the uncured state of the curable resin composition and a pre-cured state thereof is referred to as a pre-cure shrinkage ratio. Furthermore, a cure shrinkage ratio generated between the pre-cured state and the completely-cured state in a complete curing step is referred to as a complete cure shrinkage ratio.

The overall cure shrinkage ratio of the photo-curable resin composition can be calculated by measuring the specific gravity of the uncured composition (in other words, before being cured) and that of a solid after being completely cured, i.e., a completely-cured product, with an electronic hydrometer (SD-120L manufactured by MIRAGE Trading Co., Ltd.) and using a difference between these specific gravities in the following formula. Also, the pre-cure shrinkage ratio of the pre-cured resin of the photo-curable resin composition can be calculated by measuring the specific gravity of the uncured composition (in other words, before being cured) and that of a solid after being pre-cured, i.e., a pre-cured product, with the electronic hydrometer (SD-120L manufactured by MIRAGE Trading Co., Ltd.) and using a difference between these specific gravities in the following formula. The complete cure shrinkage ratio can be calculated by subtracting the pre-cure shrinkage ratio from the overall cure shrinkage.

Overall cure shrinkage ratio (%)=[(specific gravity of completely-cured product−specific gravity of uncured composition)/specific gravity of completely-cured product]×100

Pre-cure shrinkage ratio (%)=[(specific gravity of pre-cured product−specific gravity of uncured composition)/specific gravity of pre-cured product]×100

Complete cure shrinkage ratio (%)=overall cure shrinkage ratio−pre-cure shrinkage ratio The acrylic oligomer being the component (I) is used as a base material for the photo-curable resin composition. Preferred specific examples thereof may include (meth)acrylate-based oligomers having a skeleton of polyisoprene, polyurethane, polybutadiene, or the like. Note that the term "(meth)acrylate" as used herein includes both acrylate and methacrylate.

Preferred specific examples of the (meth)acrylate-based oligomer having a polyisoprene skeleton may include compounds formed by esterification of a maleic anhydride adduct of polyisoprene polymer and 2-hydroxyethyl methacrylate (UC102 (molecular weight of 17000 in terms of polystyrene), available from KURARAY CO., LTD.; UC203 (molecular weight of 35000 in terms of polystyrene), available from KURARAY CO., LTD.; UC-1 (molecular weight of 25000 in terms of polystyrene), available from KURARAY CO., LTD.).

Preferred specific examples of the (meth)acrylic oligomer having a polyurethane skeleton may include aliphatic urethane acrylates (EBECRYL230 (molecular weight of 5000), available from DAICEL-CYTEC Company Ltd.; and UA-1, available from Light Chemical Industries Co., Ltd.).

A known (meth)acrylate-based oligomer having a polybutadiene skeleton can be employed.

The acrylate-based monomer component being the component (II) is used as a reactive diluent for imparting sufficient reactivity and coating properties, etc., to the photo-curable resin composition in the manufacturing steps of the image display device. Examples of such an acrylate-based monomer may include 2-hydroxypropyl methacrylate, benzyl acrylate, and dicyclopentenyl oxyethyl methacrylate.

A plasticizer component (the component (IV)) is used for imparting shock-absorbing properties to a cured resin layer and also for reducing the cure shrinkage ratio of the photo-curable resin composition. The plasticizer component does not react with the acrylate-based oligomer component being the component (I) and the acrylate-based monomer component being the component (II) when irradiated with ultraviolet rays. Such a plasticizer component includes a solid tackifier (1) and a liquid oil component (2).

Examples of the solid tackifier (1) may include terpene-based resins such as a terpene resin, a terpene phenol resin, and a hydrogenated terpene resin; rosin resins such as natural rosin, polymerized rosin, rosin ester, and hydrogenated rosin; and a terpene-based hydrogenated resin. A nonreactive oligomer, obtained by polymerizing the above-described acrylate-based monomers into a low-molecular polymer in advance, can also be used. Specific examples thereof may include a copolymer of butylacrylate and 2-hexyl acrylate and acrylic acid, and a copolymer of cyclohexyl acrylate and methacrylic acid.

The liquid oil component (2) may contain a polybutadiene-based oil, a polyisoprene-based oil, or the like.

A known radical photopolymerization initiator can be used as the photopolymerization initiator being the component (III). Examples thereof may include 1-hydroxy-cyclohexyl phenyl ketone (Irgacure 184, available from Ciba Specialty Chemicals Inc.), 2-hydroxy-1-{4-[4-(2-hydroxy-2-methyl-propionyl)benzyl]phenyl}-2-methyl-1-propane-1-one (Irgacure 127, available from Ciba Specialty Chemicals Inc.), benzophenone, and acetophenone.

If the amount of such a photopolymerization initiator is too small, sufficient curing cannot be achieved when irradiated with ultraviolet rays. If the amount thereof is too large, the amount of outgas due to cleavage tends to be increased to adversely form foam. Thus, the amount of the photopolymerization initiator with respect to 100 parts by mass of the acrylate-based oligomer (I) and the acrylate-based monomer (II) in total is preferably 0.1 to 5 parts by mass, and more preferably 0.2 to 3 parts by mass.

Moreover, the photo-curable resin composition 3 can also contain a chain transfer agent in order to adjust its molecular weight. Examples thereof may include 2-mercaptoethanol, lauryl mercaptan, glycidyl mercaptan, mercaptoacetic acid, 2-ethylhexyl thioglycolate, 2,3-dimethylcapto-1-propanol, and α-methylstyrene dimer.

Moreover, the photo-curable resin composition 3 can further contain a bonding improving agent such as a silane coupling agent and commonly-used additives such as an antioxidant if necessary.

The cure shrinkage ratio of the photo-curable resin composition 3 is limited to be less than 3% in the complete curing step performed after the pre-curing step to be described later. Thus, it is not essentially indispensable for the photo-curable resin composition 3 to contain the plasticizer component. However, in order to impart the shock-absorbing properties to the cured resin layer, for example, the photo-curable resin composition 3 may contain the plasticizer component (component (IV)) within a range so as not to impair the advantageous effects of the present invention. Therefore, while the total amount of the acrylate-based oligomer component being the component (I)) and the acrylate-based monomer component being the component (II) in the photo-curable resin composition is preferably from 25 to 85 mass %, the amount of the plasticizer component (component (IV)) contained is from 0 to 65 mass %.

<Step (B) (Pre-Curing Step)>

Next, as shown in FIG. 1C, the photo-curable resin composition 3 applied in the step (A) is irradiated with ultraviolet rays to be pre-cured, thereby forming a pre-cured resin layer 5. Such pre-curing is performed here to convert the photo-curable resin composition 3 from a liquid state to a state where it does not flow significantly. As a result, the photo-curable resin composition 3 is prevented from dropping even if it is turned upside down as shown in FIG. 1D, thereby improving handling properties thereof. Moreover, such pre-curing allows the light-transmitting cured resin layer between the light-shielding layer 1 and the image display member to be sufficiently photo-cured without being removed from therebetween. It is also possible to reduce the cure shrinkage thereof. The level of such pre-curing corresponds to a level such as to achieve a cure rate (gel fraction) of the pre-cured resin layer 5 preferably from 10 to 80%, and more preferably from 40 and 70%. The cure rate (gel fraction) herein refers to a numerical value defined to be a ratio of the abundance of a (meth)acryloyl group after the irradiation of ultraviolet rays with respect to the abundance of the (meth)acryloyl group in the photo-curable resin composition 3 before the irradiation of ultraviolet rays (i.e., consumption ratio). The larger such numerical value is, the further the curing proceeds.

Note that the cure rate (gel fraction) can be calculated by substituting an absorption peak height (X) of the resin composition layer before the irradiation of ultraviolet rays at from 1640 to 1620 cm$^{-1}$ from a baseline in an FT-IR measurement chart and an absorption peak height (Y) of the resin composition layer after the irradiation of ultraviolet rays at from 1640 to 1620 cm$^{-1}$ from a baseline in an FT-IR measurement chart into the following formula.

Cure rate (%)={(X−Y)/X}×100

With regard to the irradiation of ultraviolet rays, the type of a light source, output, the accumulated amount of light and the like are not particularly limited as long as the pre-curing can be achieved with the cure rate (gel fraction) being preferably from 10 to 80%. Publicly known conditions for radical photopolymerization process on (meth)acrylate using the irradiation of ultraviolet rays may be employed.

Also, with regard to the conditions for ultraviolet irradiation, it is preferred to select conditions, within the above-described range of the cure rate, such as to prevent dripping or deformation of the pre-cured resin layer 5 during bonding operation in the step (C) described later. The conditions to prevent such dripping or deformation can be expressed, in terms of viscosity, as being 20 Pa·s or more (as measured with a cone-plate rheometer at 25° C., with a cone/plate C35/2, and the number of revolutions is 10 rpm).

The cured level in the pre-curing is such that the curing is made so as to limit the cure shrinkage ratio generated during the change from the pre-cured resin layer to the cured resin layer in the complete curing step to be described later to be less than 3%. In other words, in the case of a photo-curable resin composition whose overall cure shrinkage ratio is 5%, pre-cure shrinkage by at least about 2% due to pre-curing needs to be achieved during the pre-curing step.

<Step (C) (Bonding Step)>

Next, as shown in FIG. 1E, the light-transmitting cover member 2 is bonded to the image display member 6 from a side thereof on which the pre-cured resin layer 5 is formed. Such bonding can be performed by the application of pressure at a temperature of from 10° C. and 80° C. using a publicly known pressure bonding device.

<Step (D) (Complete Curing Step)>

Next, as shown in FIG. 1F, the pre-cured resin layer 5 held between the image display member 6 and the light-transmitting cover member 2 is irradiated with ultraviolet rays so as to achieve the complete curing thereof. If necessary, a resin layer between the light-shielding layer of the light-transmitting cover member 2 and the image display member 6 is irradiated with ultraviolet rays so as to be completely cured. As a result, the image display member 6 and the light-transmitting cover member 2 are stacked via a light-transmitting cured resin layer 7, thereby obtaining an image display device 10 (FIG. 1G).

Examples of the image display member 6 can include a liquid crystal display panel, an organic EL display panel, a plasma display panel, and a touch panel. The touch panel mentioned herein means an image display and input panel corresponding to a combination of a display element such as a liquid crystal display panel and a pointing input device such as a touch pad.

The purpose of the complete curing performed in this step is to sufficiently cure the pre-cured resin layer 5 so as to bond and stack the image display member 6 and the light-transmitting cover member 2. The level of such complete curing is a level such as to achieve the cure rate (gel fraction) of the light-transmitting cured resin layer 7 preferably 90% or more and more preferably 95% or more.

Note that the light-transmitting level of the light-transmitting cured resin layer 7 is required only to allow an image formed on the image display member 6 to be visually recognized.

Although the example in which the photo-curable resin composition is applied to the light-shielding layer forming surface of the light-transmitting cover member was described with reference to FIGS. 1A to 1G, an example in which the photo-curable resin composition is applied to the surface of the image display member will be described below with reference to FIGS. 2A to 2F. Note that the same reference numerals in the figures represent the same constituting elements.

<Step (AA) (Application Step)>

First, as shown in FIG. 2A, the photo-curable resin composition 3 is applied to a surface of the image display member 6 so as to form a flat surface. In this case, the photo-curable resin composition 3 is applied to a thickness preferably from 2.5 to 40 times, more preferably from 2.5 to 12.5 times, and further preferably from 2.5 to 4 times that of a light-shielding layer so as to cancel a step formed between the light-shielding layer and the light-shielding layer forming surface of a light-transmitting cover member.

Note that the application of the photo-curable resin composition 3 can be performed several times in order to obtain a required thickness.

<Step (BB) (Pre-Curing Step)>

Next, as shown in FIG. 2B, the photo-curable resin composition 3 applied in the step (AA) is irradiated with ultraviolet rays to be pre-cured, thereby forming a pre-cured resin layer 5 (FIG. 2C). The purpose of the pre-curing here is to convert the photo-curable resin composition 3 from a liquid state to a state where it does not flow significantly in order to improve the handling properties thereof and also to allow the step of the light-shielding layer of the light-transmitting cover member to be pressed therein so as to cancel the step when the light-shielding layer of the light-transmitting cover member is layered. Moreover, such pre-curing allows the light-transmitting cured resin layer between the light-shielding layer and the image display member to be sufficiently photo-cured without being removed therefrom. It is also possible to reduce the cure shrinkage thereof. The level of such pre-curing is a level such as to achieve a cure rate (gel fraction) of the pre-cured resin layer 5 being preferably from 10 to 80% and more preferably from 30 to 60%.

<Step (CC) (Bonding Step)>

Next, as shown in FIG. 2D, the light-transmitting cover member 2 is bonded to the pre-cured resin layer 5 of the image display member 6 from the side where the light-shielding layer 1 is formed. Such bonding can be performed by applying pressure at a temperature of from 10° C. to 80° C. using a known pressure bonding device.

<Step (DD) (Complete Curing Step)>

Next, as shown in FIG. 2E, the pre-cured resin layer 5 held between the image display member 6 and the light-transmitting cover member 2 is irradiated with ultraviolet rays so as to perform the complete curing thereof. If necessary, the resin layer between the light-shielding layer of the light-transmitting cover member 2 and the image display member 6 is irradiated with ultraviolet rays so as to be completely cured. Accordingly, the image display member 6 and the light-transmitting cover member 2 are stacked via the light-transmitting cured resin layer 7, thereby obtaining the image display device 10 (FIG. 2F).

Examples of the image display member 6 may include a liquid crystal display panel, an organic EL display panel, a plasma display panel, and a touch panel.

The level of such complete curing in this step is a level such as to achieve a cure rate (gel fraction) of the light-transmitting cured resin layer 7 of preferably 90% or more, and more preferably 95% or more.

Note that the light-transmitting level of the light-transmitting cured resin layer 7 is required only to allow an image formed on the image display member 6 to be visually recognized.

EXAMPLES

Hereinafter, the present invention will be described in more detail by means of Examples. Note that in the following examples, the overall cure shrinkage ratio, pre-cure shrinkage ratio, and complete cure shrinkage ratio of the photo-curable resin composition were calculated by measuring specific gravities of the photo-curable resin composition, the pre-cured product, and the completely-cured product with the electronic hydrometer (SD-120L manufactured by MIRAGE Trading Co., Ltd.) and substituting those measurement results into the following formulas.

Overall cure shrinkage ratio (%)=[(specific gravity of completely-cured product−specific gravity of uncured composition)/specific gravity of completely-cured product]×100

Pre-cure shrinkage ratio (%)=[(specific gravity of pre-cured product−specific gravity of uncured composition)/specific gravity of pre-cured product]×100

Complete cure shrinkage ratio (%)=overall cure shrinkage ratio−pre-cure shrinkage ratio Example 1

Step (A) (Application Step)

First, a glass plate with a size of 45 mm (w)×80 mm (1)×0.4 mm (t) was prepared. A light-shielding layer with a width of 4 mm was applied by means of the screen printing method with a thermosetting black ink (MRX ink, available from Teikoku Printing Inks Mfg. Co., Ltd.) over the entire peripheral portion of the glass plate so as to have a dry thickness of 40 μm. Then, the light-shielding layer was dried to provide the glass plate with the light-shielding layer.

Separately, 50 parts by mass of an acrylic oligomer having a polybutadiene skeleton (TE-2000, available from NIPPON SODA CO., LTD), 20 parts by mass of hydroxyethyl methacrylate, and 10 parts by mass of a photopolymerization initiator (3 parts by mass of Irgacure 184 manufactured by BASF Company, 7 parts by mass of SppedCure TPO manufactured by DKSH Japan K.K.) were mixed together homogeneously to prepare a photo-curable resin composition A. The photo-curable resin composition A had an overall cure shrinkage ratio of 5.6% with a cure rate being from 0% to 90%.

Also, 40 parts by mass of an acrylic oligomer having a polyisoprene skeleton (UC203, available from KURARAY CO., LTD.), 20 parts by mass of dicyclopentenyl oxyethyl methacrylate (FA512M, available from Hitachi Chemical Company, Ltd.), 3 parts by mass of hydroxypropyl methacrylate (HPMA, available from Hitachi Chemical Co, Ltd.), 15 parts by mass of tetrahydrofurfuryl acrylate (Light Ester THF, available from KYOEISHA CHEMICAL Co., LTD), lauryl acrylate (Light Ester L manufactured by KYOEISHA CHEMICAL Co., LTD), 20 parts by mass of a polybutadiene polymer (Polyoil110, available from Degussa Co., Ltd.), 45 parts by mass of a hydrogenated terpene resin (P85, available from YASUHARA CHEMICAL CO., LTD.), and 4 parts by mass of a photopolymerization initiator (Irg184D, available from BASF Company Ltd.) were mixed together homogeneously to prepare a photo-curable resin composition B. The photo-curable resin composition B had an overall cure shrinkage ratio of 3.4% with a cure rate being from 0% to 90%.

Next, these photo-curable resin compositions A and B were respectively discharged onto the entire light-shielding layer forming surfaces of the separate glass plates each having the light-shielding layer by means of a resin dispenser so as to form photo-curable resin composition films A1 and B1 having an average thickness of 200 μm, respectively. Each of the photo-curable resin composition films A1 and B1 was formed so as to extend across an almost entire region of the light-shielding layer as in FIG. 1(B) and to have a thickness greater than that of the light-shielding layer with a thickness of 40 μm by about 160 μm.

Step (B) (Pre-Curing Step (Pre-Curing Condition 1)

Next, the photo-curable resin composition films A1 and B1 were irradiated with ultraviolet rays at the intensity of 200 mW/cm$^2$ for 6 seconds by means of an ultraviolet irradiation device (LC-8 manufactured by Hamamatsu Photonics K.K.) so as to achieve an integrated light quantity of 1200 mJ/cm$^2$. As a result, the photo-curable resin composition films were pre-cured to form pre-cured resin layers A2 and B2, respectively.

The cure rates of the pre-cured resin layers A2 and B2, obtained by using, as a reference, an absorption peak height at 1640 to 1620 cm$^{-1}$ from the baseline in the FT-IR measurement chart were about 70% and about 50%, respectively.

Step (C) (Bonding Step)

Next, the glass plates obtained in the step (B) were respectively placed on surfaces of liquid crystal display elements with a size of 40 mm (W)×70 mm (L) on which polarizing plates are layered with the side of the pre-cured resin layers A2 and B2 corresponding to the side of the polarizing plates. Then, a pressure was applied from the side of the glass plates by means of a rubber roller so as to bond the glass plates thereto. When the liquid crystal display elements were visually observed from the side of the bonded glass plates, no air bubbles were observed around the light-shielding layers.

Step (D) (Complete Curing Step)

Next, the liquid crystal display elements were irradiated with ultraviolet rays (50 mW/cm$^2$) for 50 seconds by means of the ultraviolet irradiation device (LC-8 manufactured by Hamamatsu Photonics K.K.) from the side of the glass plates. As a result, the pre-cured resin layers A2 and B2 were completely cured to form light-transmitting cured resin layers A3 and B3, respectively. The cure rates of the light-transmitting cured resin layers A3 and B3 each were 98%. Thus, there were obtained liquid crystal display devices in each of which the glass plate as the light-transmitting cover member was stacked on the liquid crystal display element via the light-transmitting cured resin layer.

<Distortion Evaluation (Surface Roughness Measurement)

Separately from the manufacture of the liquid crystal display devices, the photo-curable resin compositions A and B were weighed 2 g each and put by drops onto polyester films having been subjected to a delamination treatment, thereby forming the respective photo-curable resin composition films A1 and B1 with a thickness of 1 mm. These were irradiated with ultraviolet rays from the side of the resin composition surfaces under the same conditions as the above-described pre-curing conditions 1 so as to produce the pre-cured resin layers A2 and B2. The resin surfaces thereof were brought into close contact with glass plates for liquid crystals so as to transfer the pre-cured resin layers A2 and B2 thereto.

Thereafter, the pre-cured resin layers A2 and B2 were irradiated with ultraviolet rays under the same conditions as the above-described complete curing conditions so as to achieve the complete curing thereof. A distortion (Ra: average surface roughness) in a predetermined area (2.93 mm×2.20 mm) on each of the glass plate surfaces was measured in this complete curing by means of a threedimensional contactless surface roughness gauge manufactured by Zygo Corporation. In practice, it is preferred to be 6 nm or less.

(Evaluation of Bonding State)

When fabricating a liquid crystal display device, a glass base 30 with a size of 40 mm (W)×70 mm (L) was used instead of the liquid crystal display element. A glass plate 31 including the pre-cured resin layer formed thereon was bonded to the glass base 30 from the side of the pre-cured resin layer so as to form a cross shape as shown in FIG. 3. Thus, there was obtained a bonded glass structure. Then, while fixing the glass base 30 positioned on the lower side thereof, the glass plate 31 positioned on the upper side thereof was peeled off in a straight up direction. The delamination state thereof was visually observed. Instead of interface delamination, the generation of cohesive delamination is desired.

Matters with regard to cure shrinkage ratios of the above-described photo-curable resin compositions A and B, checking of air bubbles, results of surface roughness, and evaluation of bonding state are shown in Table 1.

TABLE 1

| | Photo-curable resin composition of Example 1 | |
|---|---|---|
| | A | B |
| Overall cure shrinkage ratio (%) of photo-curable resin composition (Cure rate of 97%) | 5.6 | 3.4 |
| Pre-curing condition 1 — Pre-cure shrinkage ratio (%) | 2.8 | 2.1 |
| Complete cure shrinkage ratio (%) | 2.8 | 1.3 |
| Average surface roughness after completely cured | 3.0 | 1.2 |
| Presence/absence of air bubbles in step C | not observed | not observed |
| Evaluation of bonding state | Cohesive failure | Cohesive failure |

As shown in Table 1, according to the method of Example 1, the cure rates generated from a state after the pre-curing to a state after the complete curing were kept to be less than 3%, and the average surface roughnesses thereof were also small. As a result, distortions on the surfaces of the glass plates were small. In addition, the bonding states were favorable since cohesive delamination was generated.

Example 2

A liquid crystal display device and a bonded glass structure for measuring an adhesive strength were fabricated in the same manner as that of Example 1 except that the photo-curable resin composition film was formed so as to extend across about 70% of the width of the light-shielding layer in the step (A) (application step) of Example 1. Then, the presence or absence of air bubbles therein was observed, the surface roughness of the glass plate was measured, and the bonding state thereof was evaluated. As a result, even when the photo-curable resin composition film was formed so as to extend across only about 70% of the width of the light-shielding layer, the cure rate generated from a state after the pre-curing to a state after the complete curing was kept to be less than 3%. Also, no air bubbles existed in the resultant products of the respective steps and the finally-obtained liquid crystal display device. The surface roughness of the glass plate was smaller than 6 nm, and the bonding state thereof was also favorable. The reason for this can be considered that the pre-cured resin layer was spread so as to cover the entire light-shielding layer during the step (C) (bonding step).

Example 3

A liquid crystal display device and a bonded glass structure for measuring an adhesive strength were fabricated in the same manner as that of Example 1 except that the photo-curable resin composition film was formed so as to have a thickness about 1.2 times that of the light-shielding layer in the step (A) (application step) of Example 1. Then, the presence or absence of air bubbles therein was observed, the surface roughness of the glass plate was measured, and the bonding state thereof was evaluated. As a result, when the photo-curable resin composition film was formed so as to have a thickness about 1.2 times that of the light-shielding layer, no air bubbles existed in the resultant products of the respective steps of Example 3 and the finally-obtained liquid crystal display device. Also, the surface roughness of the glass plate was smaller than 6 nm, and the bonding state thereof was also favorable.

Example 4

A liquid crystal display device and a bonded glass structure for measuring an adhesive strength were fabricated in the same manner as that of Example 1 except that a photo-curable resin composition 3a was applied with the same thickness as that of the light-shielding layer 1 so as not to extend across the light-shielding layer 1 as shown in FIG. 4A and then a photo-curable resin composition 3b was further applied so as to extend across the light-shielding layer 1 as shown in FIG. 4B in the step (A) (application step) of Example 1. Then, the presence or absence of air bubbles therein was observed, and the bonding state thereof was evaluated. As a result, even when the photo-curable resin composition was formed in a multi-layered structure, the cure rate generated from a state after the pre-curing to a state after the complete curing was kept to be less than 3%. Also, no air bubbles existed in the resultant products of the respective steps of Example 4 and the finally-obtained liquid crystal display device. The surface roughness of the glass plate was smaller than 6 nm, and the bonding state thereof was also favorable.

Example 5

A liquid crystal display device and a bonded glass structure for measuring an adhesive strength were fabricated in the same manner as that of Example 1 except that the cure rate of the pre-cured resin layer in the step (B) of Example 1 was varied among 10%, 30%, 60%, and 80%, and the irradiation of ultraviolet rays in the step (D) was conducted until the cure rate of the pre-cured resin layer was reached to 99% or more. Then, the presence or absence of air bubbles therein was observed, and the bonding state thereof was evaluated. As a result, even when the cure rate of the pre-cured resin layer was changed in a range of from 10% to 80%, the cure rate generated from a state after the pre-curing to a state after the complete curing was kept to be less than 3%. Also, no air bubbles existed in the resultant products of the respective steps of Example 5 and the finally-obtained liquid crystal display device. Also, the surface roughness of the glass plate was smaller than 6 nm, and the bonding state thereof was also favorable.

Comparative Example 1

A liquid crystal display device and a bonded glass structure for measuring an adhesive strength were fabricated in the same manner as that of Example 1 except that the photo-curable resin composition 3 was formed with a thickness of about 30 μm, which is smaller than that of the light-shielding layer 1, although the photo-curable resin composition 3 was formed so as to extend across the entire region of the light-shielding layer 1 as shown in FIG. 5 in the step (A) (application step) of Example 1. Then, the presence or absence of air bubbles therein was observed, and the bonding state thereof was evaluated. As a result, although no air bubbles were observed in the resultant product of the step (A), air bubbles were observed in the resultant product of the step (C) and the resultant product (liquid crystal display device) of the step (D). The surface roughness of the glass plate was also greater than 6 nm.

Comparative Example 2

A liquid crystal display device and a bonded glass structure for measuring an adhesive strength were fabricated in the same manner as that of Example 1 except that the photo-curable resin composition 3 was applied with a height greater than that of the light-shielding layer 1, but in a dotted manner so as not to extend across the light-shielding layer 1 as shown in FIG. 6 in the step (A) (application step) of Example 1. Then, the presence or absence of air bubbles therein was observed, and the bonding state thereof was evaluated. Since it is obvious that air bubbles are wrapped in upon the irradiation of ultraviolet rays, it was bonded to the liquid crystal display device without performing the irradiation of ultraviolet rays. As a result, air bubbles were observed not only around the light-shielding layer but also in every region. The surface roughness of the glass plate was also greater than 6 nm.

Comparative Example 3

A liquid crystal display device and a bonded glass structure for measuring an adhesive strength were fabricated in the same manner as that of Example 1 except that the photo-curable resin composition 3 was formed so as not to extend across the light-shielding layer 1 and applied with a thickness smaller than that of the light-shielding layer 1 as shown in FIG. 7 in the step (A) (application step) of Example 1. Then, the presence or absence of air bubbles therein was observed, and the bonding state thereof was evaluated. As a result, although no air bubbles were observed in the resultant product of the step (A), air bubbles were observed in the resultant product of the step (C) as the bonding step and also in the resultant product (liquid crystal display device) of the step (D) (complete curing step). The surface roughness of the glass plate was also greater than 6 nm.

INDUSTRIAL APPLICABILITY

According to the method of manufacturing an image display device of the present invention, the light-transmitting cured resin layer between the light-shielding layer and the image display member can be sufficiently photo-cured without being removed therefrom. It is also possible to cancel a step formed between the light-shielding layer and the light-shielding layer forming surface of the light-transmitting cover member. It is further possible to significantly reduce the distortion of the image display member. Thus, the manufacturing method of the present invention is useful when industrially manufacturing information terminals such as a smartphone with a touch panel or a touch pad.

REFERENCE SIGNS LIST 1 light-shielding layer
2 light-transmitting cover member
2a light-shielding layer forming surface of light-transmitting cover member
3, 3a, 3b photo-curable resin composition
4 step
5 pre-cured resin layer
6 image display member
7 light-transmitting cured resin layer
10 image display device
30 glass base
31 glass plate

The invention claimed is:

1. A method of manufacturing an image display device, wherein an image display member and a light-transmitting cover member with a light-shielding layer formed on a peripheral portion thereof are stacked via a light-transmitting cured resin layer formed from a liquid photo-curable resin composition, such that a light-shielding layer forming surface of the light-transmitting cover member is disposed on a side of the image display member, the method comprising steps (A) to (D):

<Step (A)>
   applying the liquid photo-curable resin composition to the light-shielding layer forming surface of the light-transmitting cover member or a surface of the image display member to a thickness greater than that of the light-shielding layer so as to cancel a step formed between the light-shielding layer and the light-shielding layer forming surface of the light-transmitting cover member;

<Step (B)>
   pre-curing the applied photo-curable resin composition with irradiation of ultraviolet rays so as to form a pre-cured resin layer having a viscosity of 20 Pa·s or more;

<Step (C)>
   bonding the light-transmitting cover member to the image display member such that the light-shielding layer and the pre-cured resin layer are placed inside; and <Step (D)>
   subjecting the pre-cured resin layer held between the image display member and the light-transmitting cover member to the irradiation of ultraviolet rays to completely cure the resin layer to thereby stack the image display member and the light-transmitting cover member via the light-transmitting cured resin layer to obtain the image display device, wherein the liquid photo-curable resin composition comprises as main components an acrylate-based oligomer, an acrylate-based monomer, and a photopolymerization initiator.

2. The manufacturing method according to claim 1, wherein the image display member is a liquid crystal display panel, an organic EL display panel, a plasma display panel, or a touch panel.

3. The manufacturing method according to claim 2, wherein in the step (A) the photo-curable resin composition is applied to a thickness from 2.5 to 40 times that of the light-shielding layer.

4. The manufacturing method according to claim 2, wherein in the step (B) the photo-curable resin composition is irradiated with ultraviolet rays to be pre-cured to make the cure rate of the pre-cured resin layer from 10 to 80%.

5. The manufacturing method according to claim 2, wherein in the step (D) the pre-cured resin layer is irradiated with ultraviolet rays to be completely cured to make the cure rate of the light-transmitting cured resin layer 90% or greater.

6. The manufacturing method according to claim 1, wherein in the step (A) the photo-curable resin composition is applied to a thickness from 2.5 to 40 times that of the light-shielding layer.

7. The manufacturing method according to claim 1, wherein in the step (B) the photo-curable resin composition is irradiated with ultraviolet rays to be pre-cured to make the cure rate of the pre-cured resin layer from 10 to 80%.

8. The manufacturing method according to claim 1, wherein in the step (D) the pre-cured resin layer is irradiated with ultraviolet rays to be completely cured to make the cure rate of the light-transmitting cured resin layer 90% or greater.

* * * * *